United States Patent Office 3,162,954
Patented Dec. 29, 1964

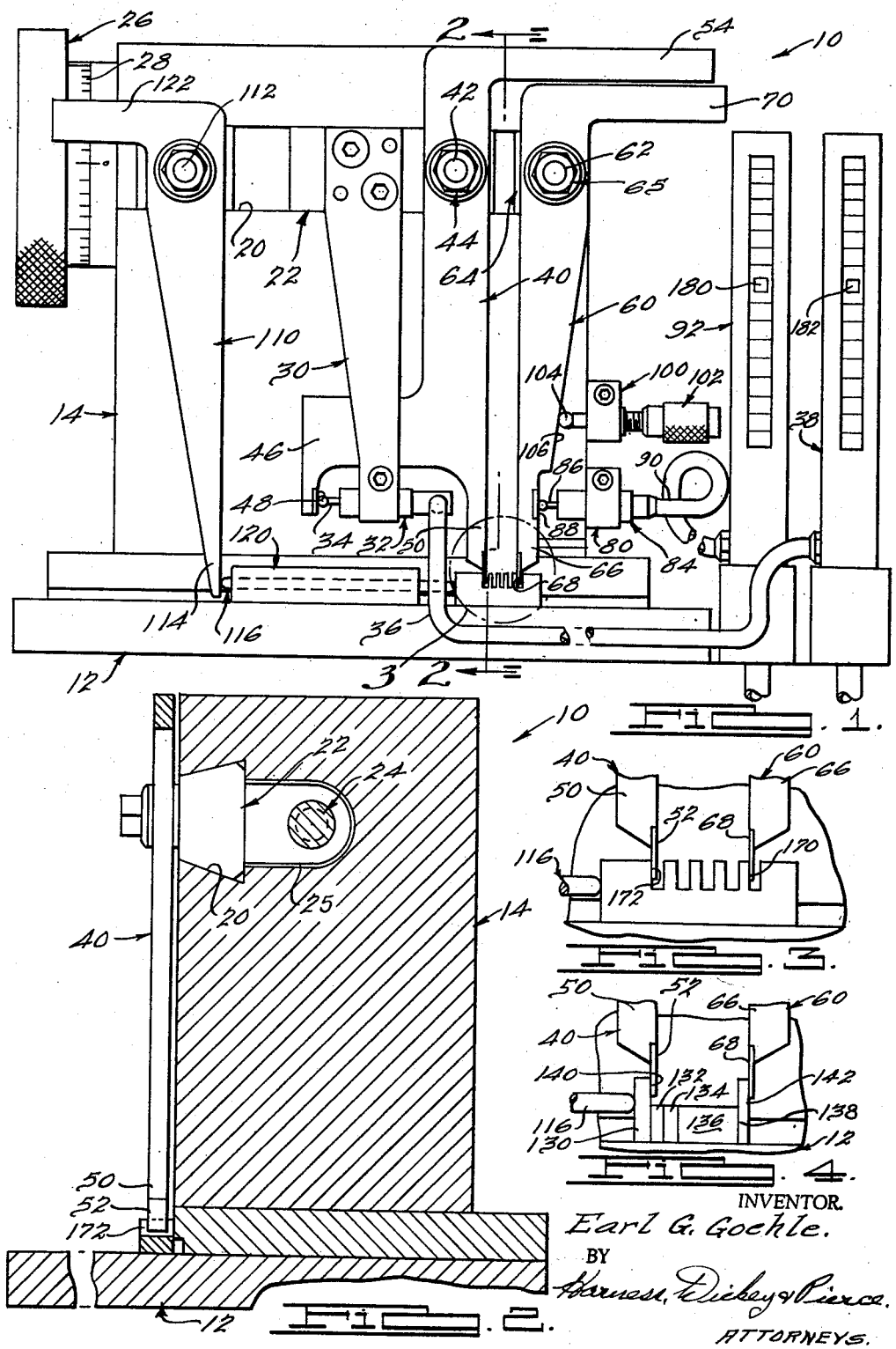

3,162,954
SPACING GAUGE
Earl G. Goehle, Grosse Pointe Shores, Mich., assignor, by mesne assignments, to Gay-Lee Company, a corporation of Michigan
Filed Aug. 23, 1962, Ser. No. 219,064
1 Claim. (Cl. 33—148)

This invention relates generally to gauges, and more particularly to an improved spacing gauge capable of measuring the spacing between surfaces to accuracies of .00005 inch.

The advent of the modern multi-channel tape recorder has created a need for recording heads manufactured to tolerances of .00005 inch and less in that minute variations in the spacing between adjacent channels effects cross talk and other diminutions of fidelity in the translation of signals to and from, for example, a magnetic tape. Very highly specialized and accurate tools have been devised for the manufacture of such recording heads. However, as is found in all manufacturing processes, certain deviations and errors occur during manufacture which necessitate that each head be carefully checked to ascertain that the proper spacial relations are maintained.

A spacing gauge in accordance with the instant invention effects measurement of the spacing between, for example, adjacent channels of a recording head in a minimum of time and to a degree of accuracy heretofore unknown.

Accordingly, one object of the instant inpention is an improved spacing gauge.

Another object is a spacing gauge that is relatively fast in operation.

Another object is a spacing gauge that is relatively easily calibrated.

Another object is a spacing gauge having a high degree of repeatability of measuring accuracy.

Another object is a spacing gauge that is relatively easily readable.

Other objects and advantages of the instant invention will be apparent from the following specification, claim and drawings wherein:

FIGURE 1 is a side elevational view of a spacing gauge in accordance with an exemplary constructed embodiment of the instant invention;

FIG. 2 is a cross sectional view taken substantially along the line 2—2 of FIGURE 1;

FIG. 3 is an enlarged fragmentary view of the area within the circle 3 of FIGURE 1; and FIG. 4 is a view similar to FIG. 3 showing calibration of the spacing gauge.

A spacing gauge 10, in accordance with an exemplary constructed embodiment of the instant invention, comprises a base 12 having a mounting block 14 secured thereto by any suitable means. The mounting block 14 has a dovetailed way 20 therein (FIG. 2) for the acceptance of a slide 22 that is movable longitudinally of the way 20 upon rotation of a screw 24. The screw 24 extends through complementary nuts 25 that are secured to and extend rearwardly of the slide 22. The screw 24 is rotatable by a hand wheel 26 having suitable indicia 28 thereon to roughly position the slide 22 longitudinally of the ways 20.

As best seen in FIGURE 1, the slide 22 has a downwardly depending slide arm 30 fixedly secured thereto for the support of a plunge jet 32. The plunge jet 32 is conventional in construction, having a movable orifice controlling piston 34 and an air inlet conduit 36 connected thereto and to a float gauge 38.

A gauge blade arm 40 is pivotally secured to the slide 22 as by a pivot pin 42, a conventional nut 44 retaining the arm 40 on the pin 42. The gauge blade arm 40 has a horizontally extending finger portion 46 at a lower end thereof with a gauge surface 48 thereon for engagement with the piston 34 of the plunge jet 32.

As best seen in FIGS. 3 and 4, the gauge arm 40 has a downwardly extending lower end portion 50 thereon for the support of a gauge blade 52, the function of which will be described hereinafter. The gauge blade arm 40 has also a horizontally extending finger portion 54 that extends oppositely to the finger 46 to effect static balancing of the arm 40 about the pivot pin 42.

An index arm 60 is pivotally supported by a pin 62 in a way block 64. The block 64 is fixedly supported in the ways 20 of the block 14. The arm 60 is retained on the pin 62 as by a nut 65.

A lower end portion 66 of the arm 60 has a gauge blade 68 thereon for engagement with one surface of the workpiece, as will be described. The arm 60 has a horizontally extending finger portion 70 at the upper end thereof to effect static balancing of the arm 60.

As seen in FIGURE 1, a plunge jet support block 80 is fixedly secured to the mounting block 14, by any suitable means, for the support of a plunge jet 84. The plunge jet 84 has a reciprocable piston 86 that is engageable with a gauge surface 88 on the lower end portion 66 of the arm 60. The plunge jet 84 also has an air inlet conduit 90 connected thereto and to a conventional float gauge 92.

The mounting block 14 has a caliper block 100 thereon for the support of a caliper 102. An end portion 104 of the caliper 102 is engageable with a complementary surface 106 on the arm 60 to initially position the index arm 60, as will be described.

As best seen in FIGURE 1 of the drawings, a pressure arm 110 is pivotally supported on a pivot pin 112 in a block 113 that is fixedly secured in the ways 20. The pressure arm 110 has a lower end portion 114 that is engageable with a slidable pressure pin 116 to normally bias the workpiece against the gauge blade 68 on the index arm 60. The pressure pin 116 is supported in a complementary block 120. The pressure arm 110 has a horizontally extending end portion 122, the weight of which maintains a predetermined and controlled bias on the pin 116.

The spacing gauge 10 is calibrated by first positioning the slide 22 and associated depending structures, namely, the arms 30 and 40 relative to the index arm 60, as by rotating the wheel 26. The indicia on the wheel 26 is used to roughly position the slide 22 so that when the gauge blades 52 and 68 on the arms 40 and 60, respectively, are approximately at a desired spacing, the arms 40 and 60 extend in substantially vertical parallel relationship.

As best seen in FIG. 4, suitable gauge blocks 130, 132, 134, 136 and 138, the additive length of which is equal to a desired spacing between surfaces of a finished part, are then positioned under the gauge arm 40 and index arm 60 so that the gauge blade 68 on the arm 60 engages a surface 142 on the block 138.

It is to be noted that the calibrating blocks 130, 132, 134, 136 and 138 are biased against the blade 68 on the index arm 60 at a predetermined bias related to the weight of the finger portion 122 of the pressure arm 110. The index arm 60 is restrained against movement under the aforesaid bias of the pressure arm 110 due to engagement with the end portion 104 of the caliper 102.

Upon the application of air pressure to the float gauge 92 at, for example, 10 lbs. per square inch, the piston 86 of the plunge jet 84 is biased against the gauge surface 88 on the index arm 60. Also, a float 180 in the float gauge 92 is biased upwardly due to air pressure within the gauge 92, the height at which the float is sustained reflecting the axial position of the plunge jet piston 86. The caliper 162 is then adjusted so that the float 180 in the gauge 92 is positioned at an index position. When this condition obtains, the gauge blade 68 on the index arm 60 is positioned at what may be termed a fiducial position.

The hand wheel 26 is then rotated to advance or retract the slide 22 and with it, the arms 30 and 40, thereby to position the gauge blade 52 on the gauge arm 40 against the surface 140 of the gauge block 130. This adjustment is indexed by a float 182 in the float gauge 38, which reflects the axial position of the piston 34 of the plunge jet 32. When the float 182 in the float gauge 38 is at a desired index position, the gauge blades 52 and 68 on the gauge arms 40 and index arm 60 are at a predetermined spacing dictated by the spacing between the surfaces 140 and 142 on the gauge blocks 130, and 138, respectively. It is also to be noted that the gauge blades 52 and 68 are biased into engagement with the gauge block 130 and gauge block 138 by a predetermined bias.

After the spacing gauge 10 is calibrated in the aforementioned manner, the gauge blocks 130, 132, 134, 136 and 138 are removed and the workpiece is substituted therefor. As best seen in FIG. 3, a surface 170 is biased into engagement with the gauge blade 68 on the index arm 60 with the same bias exerted through the pressure arm 110. Any variation between the spacing of the surface 170 and a surface 172 on the workpiece will be evidenced by rotation of the gauge arm 40, which rotation results in an axial displacement of the piston 34 of the plunge jet 32 and the variation in the level of the float 162 in the float gauge 38.

From the foregoing description, it should be apparent that the spacing gauge 10 of the present invention offers a practical solution to the problem of measuring the spacing between surfaces to an accuracy of, for example, .00005 inch, is relatively easily calibrated, and is relatively easily maintained in the calibrated condition. Further, the workpiece is subjected to exactly the same environmental conditions as the gauge blocks used to calibrate the spacing gauge.

It is to be understood that the specific construction of the improved spacing gauge herein disclosed and described is presented for the purpose of explanation and illustration and is not intended to indicate limits of the invention, the scope of which is defined by the following claim.

What is claimed is:

A gauge for measuring the spacing between points on a workpiece comprising
   a pivoted index arm having
      a workpiece engaging blade,
   a pressure arm for biasing the workpiece towards said index arm,
   means restraining movement of said index arm under the bias of said pressure arm,
   means for indicating the rotative position of said index arm,
   a pivoted gauge arm
      extending generally parallel to said index arm having a workpiece engaging blade,
   means for indicating the rotative position of said gauge arm, and
   means for moving the pivotal axis of said gauge arm relative to the pivotal axis of said index arm.

References Cited in the file of this patent

UNITED STATES PATENTS

| | | |
|---|---|---|
| 1,498,750 | Prestivich | June 24, 1924 |
| 2,874,475 | McGaffey | Feb. 24, 1959 |
| 2,889,631 | Worrall | June 9, 1959 |
| 3,037,332 | Wiatt et al. | June 5, 1962 |

FOREIGN PATENTS

| | | |
|---|---|---|
| 238,859 | Switzerland | Dec. 3, 1945 |